United States Patent [19]  
Sfredda

[11] Patent Number: 4,478,100  
[45] Date of Patent: Oct. 23, 1984

[54] AUTOMATIC TRANSMISSION

[76] Inventor: Albert P. Sfredda, 2106 Iris Pl., Bethlehem, Pa. 18018

[21] Appl. No.: 355,353

[22] Filed: Mar. 8, 1982

[51] Int. Cl.$^3$ .................... F16H 13/02; F16H 13/10; F16H 1/28
[52] U.S. Cl. .................................... 74/206; 74/804; 74/211
[58] Field of Search ................ 74/206, 796, 804, 211, 74/793, 209, 208

[56] References Cited

U.S. PATENT DOCUMENTS

| | | | |
|---|---|---|---|
| 3,364,761 | 1/1968 | Nasvytis | 74/798 |
| 3,530,742 | 9/1970 | Sfredda | 74/796 |
| 3,602,070 | 8/1971 | Verge | 74/804 |
| 3,945,270 | 3/1976 | Nelson et al. | 74/206 |
| 4,112,788 | 9/1978 | Sfredda | 74/804 |
| 4,184,388 | 1/1980 | Sfredda | 74/793 |
| 4,237,751 | 12/1980 | Davis | 74/804 |
| 4,302,988 | 12/1981 | Takahashi et al. | 74/206 |

Primary Examiner—Lawrence J. Staab  
Assistant Examiner—Michael D. Bednarek

[57] ABSTRACT

An infinitely variable speed automatic transmission employs a housing that fixedly supports an annular toothed raceway. A toothed wheel having an inner raceway is disposed within the toothed raceway and has rolling contact and tooth interengagement therewith. The housing supports a rotatable drive shaft that is concentric with the toothed raceway and supports a radially moveable roller bearing. A drive roller engages the roller bearing and the wheel's inner raceway. A stabilizing roller contacts the wheel's inner raceway and is supported by an arm that is secured to an output shaft. The output and input shafts are axially aligned. Rotation of the drive shaft will cause the roller bearing to impart radial driving impulses to the wheel through the drive roller. In turn the wheel transmits planetary rotation to the stabilizing roller, which rotates the output shaft through the connecting arm.

The wheel acts as a circular lever with the fulcrum being on the wheel's contact point with the toothed raceway. The load resistance on the output shaft plus the magnitude of the driving impulses on the wheel determines the length of the wheel's effort arm, which in turn determines the output shaft speed.

8 Claims, 4 Drawing Figures

AUTOMATIC TRANSMISSION

FIELD OF THE INVENTION

The present invention relates to torque transmission devices. It relates particularly to infinitely variable speed automatic drives.

PRIOR ART

My patent Torque Transmission Device (U.S. Pat. No. 4,112,788) introduces a new principle wherein a lever effect is imparted to a rolling gear. This principle permits traction to share the tooth loads in a fixed speed gear drive.

The present invention expands on the lever effect principle to provide an automatic transmission that changes the output speeds automatically in response to the driven loads.

SUMMARY OF THE INVENTION

The present invention provides an automatic transmission that converts rotary radial impulses into infinitely variable output speeds that are automatically controlled by the driven loads.

The geometry of this drive provides automatic speed changes without the complicated gear trains and clutching mechanisms that are required in the conventional automatic drives. This drive is capable of operating with output speed ratios ranging from 10:1 to zero, which is especially suitable for the high torque demands of tractors and other off highway vehicles. This drive has other general automotive uses and many industrial applications such as highly loaded mixers, conveyors and machine drives.

According to the invention, a housing supports an annular toothed raceway. A toothed wheel having an inner raceway is disposed within the toothed raceway and has rolling contact and tooth interengagement therewith. The housing supports a rotatable drive shaft that is concentric with the toothed raceway and supports a radially moveable roller bearing. A drive roller engages the roller bearing and the wheel's inner raceway. A stabilizing roller engages the wheel's inner raceway and is supported by an arm that is secured to an output shaft. The output and input shafts are axially aligned. Rotation of the drive shaft will cause the roller bearing to impart radial driving impulses to the wheel through the drive roller. In turn the wheel transmits planetary rotation to the stabilizing roller which rotates the output shaft through the connecting arm.

The wheel acts as a circular lever with the fulcrum being on the wheel's contact point with the toothed raceway. The load resistance on the output shaft plus the magnitude of the driving impulses on the wheel determines the length of the wheel's effort arm, which in turn determines the output shaft speed.

In a modified form of the drive, a flexible coupling connects the wheel to the output shaft to transmit the wheel torque. This replaces the aforementioned arm that connects the stabilizing roller with the output shaft. The modification employing the flexible coupling provides a higher torque capacity but a lesser operating ratio range.

An object of the present invention is to provide an infinitely variable speed automatic drive that is compact and can be constructed with few moving parts.

Another object of this invention is to provide an automatic drive that can automatically change speed ratios that range from approximately 10:1 to 0.

These objects and advantages of the present invention will become more readily apparent from the following description when taken together with the accompanying drawings, wherein:

DISCLOSURE OF THE EMBODIMENT

Figure 1:
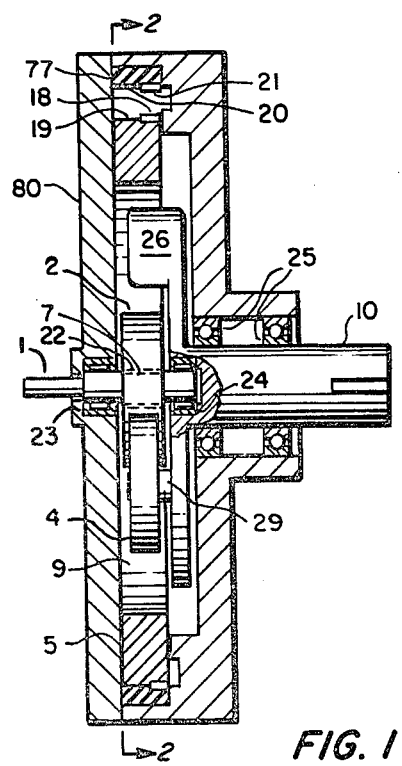
FIG. 1 is a sectional axial view of the automatic drive.
Figure 2:
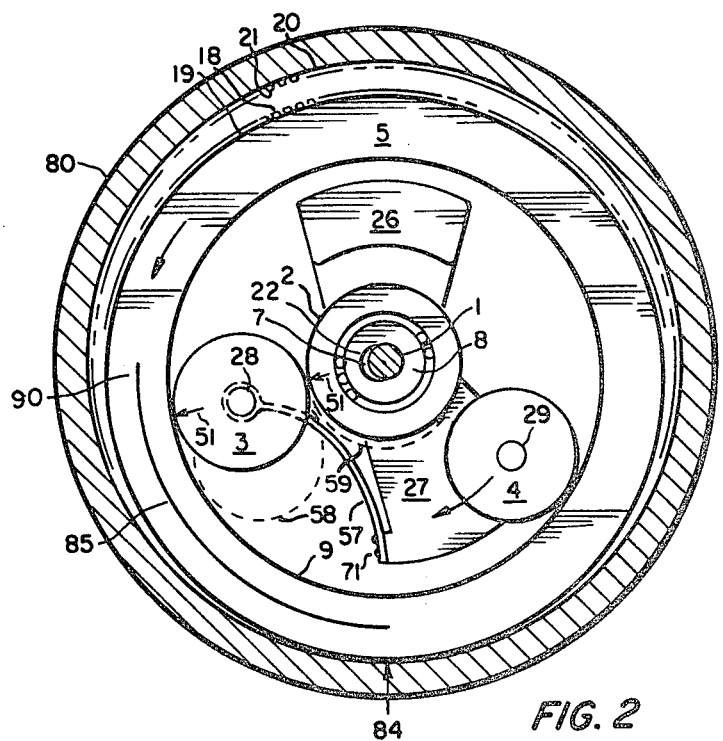
FIG. 2 is a sectional view taken along planes indicated by view line 2—2 FIG. 1.
Figure 3:
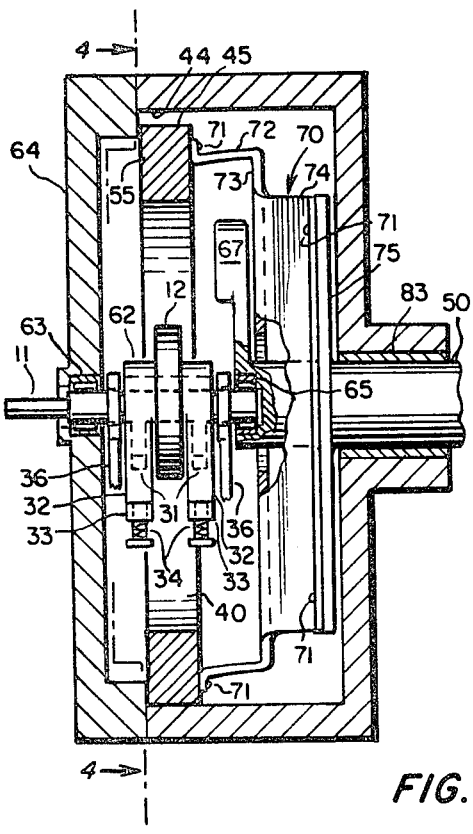
FIG. 3 is a sectional axial view of a second form of the automatic drive.

Referring to FIGS. 1 and 2, the numeral 1 indicates a drive shaft. Roller bearing 2 is mounted on eccentric shaft portion 7. Bore 22 is disposed eccentrically on the inner race 8 of bearing 2. Race 8 is rotatable relative to drive shaft 1. This permits bearing 2 to swing radially upon the rotation of drive shaft 1. Drive shaft 1 is rotatably supported by roller bearing 23 mounted on housing 80 and by roller bearing 24 mounted on output shaft 10. Wheel 5 has teeth 18 that are disposed adjacently to the wheel's rolling surface 19. Rolling surface 19 contacts rolling surface 20 of toothed raceway 77 that is fixedly mounted in housing 80. The rolling surfaces' diameters are generally equal to the pitch diameters of the adjacent teeth. This provides uniform tooth loading between the meshing teeth 18 and 21 and provides traction to share the tooth loads. Raceway 9 on wheel 5 provides a rolling surface for drive roller 3 and stabilizing roller 4. Arm 27 is rigidly secured to output shaft 10 and rotatably supports roller 4 by rigidly attached axle 29. Leaf spring 57 is secured to roller axle 28 in drive roller 3 and to arm 27 by screw 71. Spring 57 urges the rollers 3 and 4 opposite directions to maintain rolling contact with raceway 9. Drive roller 3 is also urged to maintain rolling contact with roller bearing 2 by spring 57. Other suitable means can replace spring 57 to maintain contact between the rolling elements. Roller 4 stabilizes wheel 5 as it rotates. Additional rollers 4 with joined arms 27 can be disposed in a radial plane. In this manner rollers 4 will act against each other to maintain contact with raceway 40 (not shown). Stabilizing roller 4 and arm 27 transmit the torque from wheel 5 to output shaft 10. The torque from wheel 5 can be transmitted to the output shaft 10 with a flexible coupling 70 in a similar manner as shown in FIG. 3. Ball bearings 25 are mounted on housing 80 and rotatably support output shaft 10. Weight 26 is rigidly secured to output shaft 10 and provides dynamic balance.

In the operation, clockwise rotation of drive shaft 1 causes roller bearing 2 to move radially due to its eccentric location on drive shaft 1 and by centrifugal force. This rotary radial movement imparts a radial driving force to wheel 5 through drive roller 3 (indicated by arrows 51). Each rotation of drive shaft 1 will impart a single impulse to wheel 5 thereby causing the wheel to act as a lever with its fulcrum being on rolling surface 20 (indicated by arrow 84). Each impulse imparted to wheel 5 will rotate wheel 5 a fraction of a turn counterclockwise on rolling surface 20. Wheel 5 will force stabilizing roller 4 and output shaft 10 to advance in a clockwise direction. Spring 57 which is attached to arm 27 and roller axle 28 will advance with stabilizing roller 4 and will provide spring loading to maintain the rolling contact of drive roller 3 with roller bearing 2 and wheel 5. At a fixed input drive shaft speed the rotational speed of wheel 5 is dependant upon the loading of output shaft 10. A lower output torque and higher speed demand will offer relatively less resistance to wheel 5; therefore the radial impulses imparted to wheel 5 by drive bearing 3 will effect a relatively higher speed of rotation of wheel 5. The speed changes are in response to the lever effect provided by wheel 5. The length of the operating lever arm (approx. 90 degrees from the wheel 5's contact point indicated by arrow 84 ) is indicated by line 85. The resistance of wheel 5 will determine the impulsion point of drive roller 3 on wheel 5's lever arm 85. As the load increases at the output shaft 10 the impulses from drive roller 3 will be imparted towards the end 90 of the lever arm 85. This will transmit the highest torque and the lowest speed to output shaft 10. As the load decreases there will be less resistance to the impulsion of drive roller 3, thereby increasing the length of the radial movement of roller bearing 2 and drive roller 3. This will cause the impulses from drive roller 3 to be imparted towards the fulcrum (indicated by arrow 84) of the lever arm 85 thereby increasing the speed and decreasing the torque transmitted to the output shaft 10. Although the drive members will impart impulsing forces to wheel 5, at given speeds the momentum of the output members will transmit uniform angular motion to the output shaft 10. Additional drive and driven members can be added to provide balance and smoother operation. As an example, a second drive roller 58 and roller bearing 59 axially disposed will provide two impulses per revolution of drive shaft 1 to impart a continuous driving force to wheel 5. The second roller bearing 59 can be supported on a second eccentric shaft portion (not shown) disposed 180 degrees relative to eccentric shaft portion 7. The speed ratios can range from approximately 10:1 to 0.

Conventional reversing mechanisms can be added to output shaft 10 for applications requiring two way output rotation.

Figure 4:
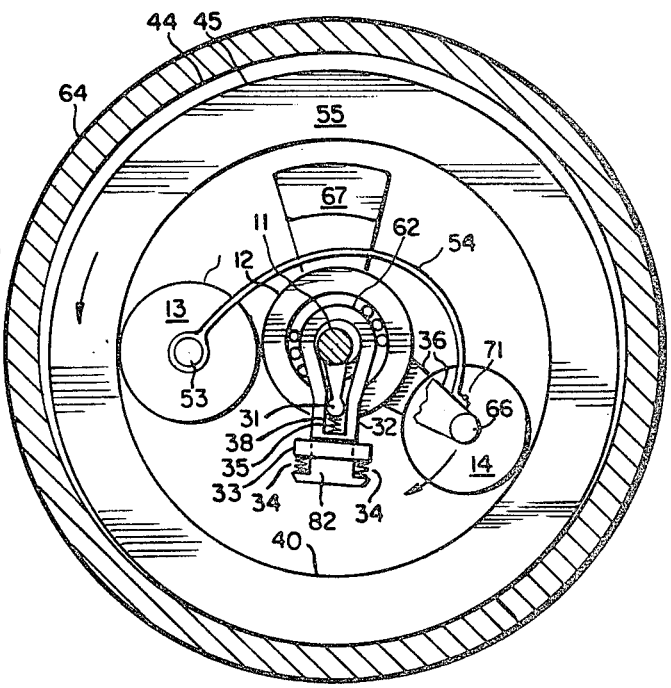
FIG. 4 is a sectional view taken along planes indicated by view line 4—4 FIG. 3.

FIGS. 3 and 4 show a second form of the automatic drive. Numeral 11 indicates a drive shaft having a pair of drive arms 31 rigidly secured thereto. Roller bearing 12 surrounds drive shaft 11. A pair of arms 32 are rigidly secured to the inner race 62 of roller bearing 12. Drive arms 31 are disposed in grooves 38 of arms 32. This permits the arms 32 to move radially relative to drive shaft 11. Weights 33 are mounted on arms 32 and can slide radially on the outer end 82 of arms 32. Compression springs 34 mounted on arms 32 press against weights 33. Compression springs 35 (two in each arm 32) mounted in grooves 38 press against the ends of drive arms 31. The compression of springs 35 assists the force imparted by the rotation of roller bearing 12. Drive shaft 11 is rotatably supported by roller bearing 63 mounted in housing 64 and by roller bearing 65 mounted in output shaft 50. Wheel 55 has a traction surface 45 which contacts raceway 44. Raceway 40 inside of wheel 55 provides a rolling surface for drive roller 13 and stabilizing roller 14. Arms 36 rotatably support stabilizing roller 14 with rigidly attached axle 66. Arms 32 are supported by drive shaft 11 and are free to rotate relative to drive shaft 11. Weight 67 on output shaft 50 helps to provide dynamic balance. Leaf spring 54 is secured to roller axle 53 on drive roller 13 and to arms 66 by screws 71. Spring 54 urges the rollers 13 and 14 in opposite directions to maintain rolling contact with raceway 40. Drive roller 13 is also urged to maintain rolling contact with roller bearing 12 by spring 54. Flexible coupling 70 comprises, support plate 73 having two pairs of axially extended flexible leaves 72 and 74 that are disposed 90 degrees relative to each other. Leaves 72 are joined to wheel 55 by screws 71, leaves 74 are joined to square plate 75 by screws 71, square plate 75 is rigidly secured to output shaft 50. Other types of flexible couplings can be substituted for the coupling described. Output shaft 50 is rotatably supported by sleeve bearing 83 that is mounted on housing 64.

In operation, clockwise rotation of drive shaft 11 will rotate arms 32 through drive arms 31. With each revolution, centrifugal force plus the yielding resistance of compression spring 35 on arms 32 cause bearing 12 to impart a radial driving impulse to wheel 55 through drive roller 13. This will rotate wheel 55 a fraction of a turn counterclockwise. Flexible coupling 70 will accommodate the eccentric rotation of wheel 55 and will transmit the well torque to output shaft 50. The output speed changing function will be identical to the drive embodiment described in FIGS. 1 and 2. The moveable weights 33 will be close to the center of rotation at slow input speeds therefore there will be less force imparted to wheel 55 by drive roller 13 and roller bearing 12, thus a relative lower output speed. This can be used as an idling condition when the drive is employed for automotive use. As the input speed is increased, the weights 33 will move outwardly and will geometrically increase impulsion forces imparted to wheel 55 by drive roller 13 and roller bearing 12. This will geometrically increase the output torque transmitted to output shaft 50.

This modification employing the flexible coupling 70 provides a higher torque capacity but a lesser operating ratio range than the embodiment shown in FIGS. 1 and 2. The additional reduction ratio provided by the wheel 55 as it eccentrically rotates on raceway 44 is transmitted to output shaft 50 by the flexible coupling 70. The ratio increases and the diameter of wheel 55 approaches the diameter of raceway 44.

Although this drive can operate as a traction drive, teeth can be added to traction surface 45 on wheel 55 to raceway 44 (similar to the drive shown in FIGS. 1 and 2).

Having described and illustrated in detail the embodiments of this invention, it will be understood that the same is offered merely by the way of example, and that this invention is to be limited only by the scope of the appended claims.

What I claim:

1. An automatic transmission comprising; a housing fixedly supporting an annular raceway, a wheel having inner concentric raceway means, said wheel disposed within said annular raceway and having rolling contact therewith, a drive shaft disposed concentrically to said annular raceway and rotatably supported by said housing, a radially moveable drive member connected to said drive shaft and engaging the inner raceway means of said wheel, means for maintaining the engagement between said drive member and said inner raceway means upon rotation of said drive member, whereby rotation of said drive shaft will cause said drive member to impart radial driving impulses to the inner raceway means of said wheel, roller means supported for planetary rotation about the axis of said drive shaft, said roller means engaging the inner raceway means of said wheel, means for maintaining the engagement between said roller means and said inner raceway means, an output shaft axially aligned with said drive shaft and rotatably supported by said housing, coupling means for connecting said wheel to said output shaft, whereby the wheel torque is transmitted to said output shaft by the coupling means.

2. A device as in claim 1 wherein said drive member connecting said drive shaft comprises, a radially moveable roller connecting said drive shaft, an additional roller interposed between and engaging said radially moveable roller and the inner raceway means of said wheel.

3. A device as in claim 2 wherein said roller connecting the drive shaft comprises, a rolling element bearing having weight means secured to the inner race of said rolling element bearing.

4. A device as in claim 1 wherein spring means are provided for connecting said drive shaft and said radially moveable drive member so as to urge radial movement to said drive member.

5. A device as in claim 1 wherein teeth are disposed about the annular raceway and the periphery of the wheel, thereby providing rolling contact and tooth interengagement between the wheel and the annular raceway.

6. A device as in claim 1 wherein means for maintaining the engagement of the drive member and the roller means with the inner raceway means comprises; spring means connecting said drive member to said roller means so as to urge the drive member and the roller means towards the inner raceway means thereby maintaining engagement therewith upon the rotation thereof.

7. An automatic transmission comprising; a fixed annular raceway, a wheel having inner concentric raceway means, said wheel disposed within said annular raceway and having rolling engagement therewith, a rotatably supported drive shaft disposed concentrically to said annular raceway, a radially moveable drive member connected to said drive shaft and engaging the inner raceway means of said wheel, means for maintaining the engagement between said drive member and said inner raceway means upon rotation of said drive member, whereby rotation of said drive shaft will cause said drive member to impart radial driving impulses to said wheel, a rotatably supported output shaft axially aligned with said input shaft, roller means engaging the inner raceway means of said wheel and including means for maintaining the engagement thereof, means for connecting said roller means to said output shaft, whereby the torque from said roller means is transmitted to said output shaft.

8. An automatic transmission comprising; a fixed annular raceway, a wheel having inner concentric raceway means, said wheel disposed within said fixed annular raceway and having rolling contact therewith, a radially movable drive member supported for rotation about an axis concentric to said fixed annular raceway, said drive member engaging the inner raceway means of said wheel, whereby rotation of said drive member will cause the drive member to impart radial driving impulses to said wheel, said impulses being imparted to said inner raceway means within an arc extending generally 90 degrees from the contact point between the wheel and the fixed annular raceway, roller means supported for planetary rotation about the axis of said fixed annular raceway, said roller means engaging the inner raceway means of said wheel, an output shaft supported for rotation on an axis concentric to said fixed annular raceway, coupling means for connecting said wheel to said output shaft, whereby the wheel torque is transmitted to said output shaft by the coupling means.

* * * * *